United States Patent
Hauschild et al.

(10) Patent No.: US 11,858,372 B2
(45) Date of Patent: Jan. 2, 2024

(54) METHOD FOR PROCESSING A PREDETERMINED COMPUTING TASK BY A DISTRIBUTED, VEHICLE-BASED COMPUTING SYSTEM AND A CORRESPONDING COMPUTING SYSTEM

(71) Applicant: Merck Patent GmbH, Darmstadt (DE)

(72) Inventors: Martin Hauschild, Munich (DE); Joachim Kolling, Eching (DE); James Kugler, Frankfurt am Main (DE); David Martin, Valley Park, MO (US)

(73) Assignee: Merck Patent GmbH, Darmstadt (DE)

( * ) Notice: Subject to any disclaimer, the term of this patent is extended or adjusted under 35 U.S.C. 154(b) by 511 days.

(21) Appl. No.: 17/266,772

(22) PCT Filed: Aug. 7, 2019

(86) PCT No.: PCT/EP2019/071269
§ 371 (c)(1),
(2) Date: Feb. 8, 2021

(87) PCT Pub. No.: WO2020/030718
PCT Pub. Date: Feb. 13, 2020

(65) Prior Publication Data
US 2021/0316632 A1   Oct. 14, 2021

(30) Foreign Application Priority Data
Aug. 9, 2018   (EP) ..................................... 18188325

(51) Int. Cl.
*B60L 53/66* (2019.01)
*B60L 53/63* (2019.01)
*G06F 9/50* (2006.01)
*G06F 11/34* (2006.01)
*H04L 67/12* (2022.01)

(52) U.S. Cl.
CPC ............... *B60L 53/66* (2019.02); *B60L 53/63* (2019.02); *G06F 9/5061* (2013.01); *G06F 11/3409* (2013.01); *H04L 67/12* (2013.01)

(58) Field of Classification Search
CPC ........................................... G06F 9/5061–5094
See application file for complete search history.

(56) References Cited

U.S. PATENT DOCUMENTS 9,393,877 B2 *   7/2016   Günter .................... B60L 53/65
2017/0110895 A1   4/2017   Low et al.
(Continued)

FOREIGN PATENT DOCUMENTS

DE   102013007676 A1   11/2014
DE   102016202813 A1   8/2017

OTHER PUBLICATIONS

European Patent Office, Summons to Attend Oral Proceedings issued in EP 18188325.7-12503 dated Sep. 29, 2022 (14 pages).
(Continued)

*Primary Examiner* — David V Henze-Gongola
(74) *Attorney, Agent, or Firm* — Wood Herron & Evans LLP

(57) ABSTRACT

A method is provided for processing a predetermined computing task by a distributed, vehicle-based computing system. By a server device, the computing task is divided into several data packets with respective computing data for a respective part of the computing task. The method includes that at least one motor vehicle is determined, which currently is in a predetermined ready state, and, in case it is in the predetermined ready state, the server device transmits to the motor vehicle at least one of the data packets and the motor vehicle processes the respective computing data of the at least one transmitted data packet. The vehicle generates a
(Continued)

respective computing result related to the data packet and transmits this computing result to the server device.

13 Claims, 2 Drawing Sheets

(56) References Cited

U.S. PATENT DOCUMENTS

2019/0047434 A1* 2/2019 Oh .................... G06Q 10/0631
2019/0174514 A1* 6/2019 Ramesh .............. G06F 9/5066

OTHER PUBLICATIONS

Abdelhamid, Sherin, et al., "Vehicle as a Resourse (VaaR)," IEEE Network, IEEE Service Center, New York, NY, US, vol. 29, No. 1, Jan. 1, 2015, pp. 12-17, XP011571229 (6 pages).

Abdelhamid, Sherin, et al., "Vehicular Clouds: Ubiquitous Computing on Wheels," In: "Memristor-Based Nanoelectronic Computing Circuits and Architectures pp. 173-198 Part of the Emergence, Complexity and Computation book series (ECC, vol. 19)" Jan. 1, 2017, XP055945497, ISSN: 2194-7287, ISBN: 978-3-319-22646-0, vol. 24, pp. 435-452, DOI: 10.1007/978-3-319-46376-6_20 (18 pages).

Arif, Samiur, et al., "Datacenter at the Airport: Reasoning about Time-Dependent Parking Lot Occupancy," IEEE Transactions on Parallel and Distributed Systems, vol. 23, No. 11, Nov. 2012, pp. 2067-2080 (14 pages).

European Patent Office, Extended European Patent Search issued in EP 18188325.7-1221 dated Feb. 18, 2019 (8 pages).

International Searching Authority, Search Report and Written Opinion issued in PCT/EP2019/071269 dated Sep. 6, 2019 (14 pages).

Kim, Taesik, et. al., "Analysis on Characteristics of Vehicle and Parking Lot as a Datacenter," 2017 4th International Conference on Computer Applications and Information Processing Technology (CAIPT), IEEE, Aug. 8, 2017, pp. 1-4 (4 pages).

* cited by examiner

METHOD FOR PROCESSING A PREDETERMINED COMPUTING TASK BY A DISTRIBUTED, VEHICLE-BASED COMPUTING SYSTEM AND A CORRESPONDING COMPUTING SYSTEM

CROSS-REFERENCE TO RELATED APPLICATIONS

This application is a national phase entry of, and claims priority to, International Application No. PCT/EP2019/071269, filed Aug. 7, 2019, which claims priority to EP 18188325.7, filed Aug. 9, 2018. The above-mentioned patent applications are incorporated herein by reference in their entireties.

TECHNICAL FIELD

This application relates to a method for processing or completing a predetermined computing task by a computing system, which is based on at least one motor vehicle. This invention also relates to the computing system as well as its components, namely a server device and at least one motor vehicle.

BACKGROUND

In a motor vehicle one or several electronic control units can be provided on board, which during a driving operation of the motor vehicle for instance can provide a chassis control function and/or an autonomous driving function. Such vehicle functions require computing performance to execute algorithms in real time. For this purpose, an electronic control unit contains a computing unit or a processing unit, which can comprise at least one microprocessor and/or at least one microcontroller. Thus, an electronic control unit represents a calculator or a vehicle computer that can provide computing capacity. This computing capacity, however, is only used during the driving operation, if the vehicle functions are required. When parking or in the parking state of the motor vehicle the computing capacity, by contrast, is not used.

From the German Patent Application No. DE 10 2013 007 676 A1 it is known that in a motor vehicle a smartphone can be operated, which is coupled to the motor vehicle via a communication link and which can commission a computation in the motor vehicle, which in turn then is executed by a control device of the motor vehicle. Hereby the smartphone can be supported for the case that a radio connection to a server of the internet is temporally interrupted such that the server is not available for the computing. Where the computing data for the commissioned computation originate from, is not described in the printed document.

It would therefore be desirable to efficiently use computing resources in a motor vehicle and thereby address at least the deficiencies in the conventional art as noted above.

SUMMARY

To address these and other problems with the conventional designs, a method is provided for processing or completing a predetermined computing task by a distributed, vehicle-based computing system. Herein, through a server device the computing task is divided or split into several data packets with respective computing data for a respective part of the computing task. The computing task consequently represents a totality or a predetermined quantity of computing data. The server device in each case provides or arranges a portion or some of these computing data in the form of a data packet. The server device is stationary, i.e. it is not part of a mobile communication device or a vehicle.

In the method, several motor vehicles, in particular at least one, more particularly more than two or more than three motor vehicles, can be operated in the way described in the following.

According to embodiments of the invention, it is envisaged that for each of the motor vehicles it is respectively determined whether the motor vehicle is currently in a predetermined ready state. The ready state comprises at least the condition that the motor vehicle is coupled to an electrical energy supply device that is external to the vehicle. The motor vehicle can consequently be supplied with external electrical energy when it is in the ready state. It thus does not need to fall back on stored energy from an energy storage that belongs to the vehicle.

The server device transmits the respective data packets in each case to one of the motor vehicles, wherein the respective data packet in each case is only transmitted to one such motor vehicle, which is in the ready state. The data packet may also be transmitted to a limited number of such motor vehicles, but not necessarily to all of the available motor vehicles. The ready state consequently determines that the respective motor vehicle is ready for receiving and/or processing at least one of the data packets. Each motor vehicle can receive a different one of the data packets such that in the motor vehicle the computing data of the respective data packet are provided. The respective motor vehicle handles or processes then the respective computing data of the at least one transmitted data packet. In other words, the motor vehicle carries out computations that are to be carried out with the computing data of the data packet. For this purpose the motor vehicle can comprise in the known manner at least one electronic control unit and/or at least one vehicle computer. By the processing of the computing data the motor vehicle generates a respective computing result related to the transmitted data packet. In other words, by way of processing of the computing data output data are generated, which represent the computing result for the data packet. The motor vehicle transmits the respective computing result to the server device. Thus, in the server device a respective computing result for the respective data packet is given without the server device itself having had to process the corresponding computing data. Rather, the respective motor vehicle was used in order to process the computing data of the respective data packet. The server device then composes from each transmitted or received computing result of the motor vehicles an overall result for the computing task. In other words, the server device combines the individual computing results that were generated from the data packets. Hereby the overall result is obtained, i.e. the solution for the computing task. The server device for this purpose has used the motor vehicles for generating or determining the computing results. Another criterion for choosing a specific motor vehicle may be that a wear level of that motor vehicle fulfils a predefined condition (e.g., motor vehicle with lowest wear or wear below a predefined level).

According to embodiments of the invention, the ready state invariably includes at least the condition that the motor vehicle is coupled to an electrical energy supply that is external to the vehicle. Hereby it is ensured that an electrical driving range of the motor vehicle is not impaired or reduced by the processing of the computing data. This renders the advantage that no energy storage of the motor vehicle is strained or reduced and thus the motor vehicle completely maintains its readiness to drive. The ready state, which has to be given for the respective motor vehicle to receive in each case at least one data packet and to process the computing data contained therein, can be set by the skilled person in such a way that in the ready state it is secured that the motor vehicle currently has computing power available, i.e. its computing power currently is not needed for the driving operation of the respective motor vehicle. The definition of the ready state consequently comprises all those operating states, in which the processing of data packets by the motor vehicle is desired or should occur. The ready state may therefore comprise additional limiting conditions.

By embodiments of the invention thus on the whole the advantage is rendered that a motor vehicle can be used for the processing of a computing task every time it is in the ready state.

Embodiments of the invention also provide additional advantages.

For the ready state to occur in a motor vehicle, its user can connect the motor vehicle, typically in the parked state, to, e.g., a public or a private power network in order to facilitate or enable hereby then the computations or the processing of at least one data packet. For instance, it may be envisaged that the motor vehicle is only connected with the power network in order to supply at least one on-board computer or vehicle computer with the electrical energy such that at least one data packet is processed. The electrical energy supply device, however, according to an embodiment is preferably realized by an electrical charging station which is provided for exchanging electrical energy between an electrical energy storage of the motor vehicle, in particular a high voltage battery, and a power network that is external to the vehicle. In other words, the ready state ensures that the calculation or processing of data packets is only initiated, when the motor vehicle is coupled to an electrical charging station for recharging electrical energy. The charging station then represents the mentioned energy supply device. The ready state then occurs in the electrical charging operation or charging process of the motor vehicle. The charging station can for instance comprise a charging cable for coupling the motor vehicle and/or an inductive charging system. In the case of an inductive charging system, a transfer of data (e.g., transfer of data packages) can be performed by a wireless connection (WLAN, mobile phone connection) and/or by modulating the magnetic field of the charging system.

One embodiment comprises that a prospective remaining standing time or remaining duration of the ready state, in particular a prospective remaining standing time or remaining duration at the said charging station, is determined and the ready state comprises that the remaining duration is larger than a predetermined minimum value. A remaining availability duration and thus the period of time still available for the processing of computing data is therefore determined. The server device consequently only sends such a data packet to the motor vehicle, which can be processed by the motor vehicle within the remaining duration. Hereby it is advantageously avoided that the processing is interrupted by the ending of the ready state, i.e. the motor vehicle is for instance disconnected from the energy supply device. The prospective remaining duration of the ready state can be determined on the basis of, e.g., reservation data for the charging station and/or on charging level data of the charging level of the electric energy storage of motor vehicle. By combining the value of the applied charging power and the difference between the charging level and the maximum charging level, the remaining charging time can be calculated which can in turn serve as estimate for the remaining duration of the ready state.

For this prognosis of the remaining time one embodiment envisages that the remaining duration is determined in dependence on a user profile and/or calendar data of a user of the motor vehicle and/or a booking duration, for which the user has booked the energy supply device. Such prognosis of the remaining time can be provided by the motor vehicle itself or by the server device or another unit not forming part of the vehicle. Also, a combined model may be envisaged, through which the remaining time prognosis is partly conducted by the motor vehicle itself, on the one hand, and the server device and/or the unit not forming part of the vehicle, on the other hand. For instance, the server device can retrieve data for the energy supply device from a database. The motor vehicle, by contrast, can generate a user profile concerning historic and/or statistically determined travel times. In the motor vehicle this can for instance be performed by a control unit, such as for instance an infotainment system (information entertainment system). As unit not forming part of the vehicle, for instance, a smart phone and/or an internet server can be provided respectively. The said user profile can describe at least one custom of the user, for instance at least one stay location visited once or several times or regularly in the past and the duration of times spent there. Calendar data can describe a current and/or a future timetable and/or plan of stays of the user. Accordingly, therefrom a prospective duration of the ready state in each case, in particular a prospective remaining parking duration of the motor vehicle can be determined. Then the established prospective overall duration or a prospective remaining duration of the ready state can be signaled. For instance, consequently the motor vehicle can signal its prospective parking time or parking period. For instance, a long-term parking, which is longer than for instance one hour, in particular more than one day, can be signaled. Hereby the advantage is rendered that by the server device the data packets are generated or arranged in such a way that a remaining duration of the ready state is considered and/or exploited. The ability to define a prospective remaining parking duration is advantageous to managing task specifications and/or orientation. Statistical usage data of one or more charging stations may also be used in order to predict within a predefined range that a predefined minimum number of motor vehicles are parked and connected to a/their respective charging station(s) at a given point of the day. Also, reservation data can be evaluated for this purpose. If a user cancels reservation, this can thus be taken in to account in advance.

However, it may also occur that the ready state ends unexpectedly. One embodiment therefore comprises that for the case that the ready state ends before the respective motor vehicle transmits the computing result for a current data packet, in the case the computing result is already given, the motor vehicle transmits the resulting computing result after the end of the ready state, in particular during a driving operation of the motor vehicle, to the server device. In the case the computing result is not given, the motor vehicle terminates computation and resumes once it re-enters the ready state. Hereby, advantageously a mechanism in the case of interruption is defined or indicated. Thus, no new computation or transmission of data packets to the motor vehicle is allowed when the motor vehicle is not connected to power. A data packet is available for reservation by a motor vehicle, when it has been transferred to the motor vehicle. If the motor vehicle does not return the results in a limited amount of time then the reservation is voided and a new motor vehicle is able to reserve it. Alternatively, each data packet can have a claim/reservation made by two or more motor vehicles. The first motor vehicle to return the result wins with the result from the second motor vehicle discarded.

In order to keep the loss of computing results to a minimum, according to one embodiment of the invention during a respective ready state in each case only one of the data packets is transmitted at a time. The next data packet is only transmitted, when the motor vehicle has transmitted the computing result for the current data packet and/or requests the next data packet. Hereby the advantage is rendered that in the motor vehicle in each case only one data packet is processed or computed at the time and thus in the case of an unexpected ending of the ready state and/or in the case of an interruption of the communication link between server device and motor vehicle only this one data packet is lost. Preferably, a single motor vehicle may only have one data packet at any time.

In the case of a motor vehicle there is the additional particular problem that it always should have a predictable or anticipatable or reproducible vehicle state. This ensures that an intended driving behavior of the motor vehicle is guaranteed. Therefore, for the at least one vehicle computer of the motor vehicle it should be ensured that by the processing of the computing data no undefined operating state is adopted, which could influence the driving behavior. Transferring program code (with programming instruction) as data packages instead of data packets with only computing data may require more tests (and in some cases must pass additional testing) in the automotive environment before such a program code may be executed inside a motor vehicle. One embodiment in this regard comprises that prior to the transmitting of the first data packet for the current ready state a calculation algorithm is deposited in the respective motor vehicle and in the respective data packets only those input data, which are to be computed by the calculation algorithm, are contained as the computing data. The calculation algorithm for instance can be stored during the manufacture of the motor vehicle or in a software update in the motor vehicle. The calculation algorithm in the respective motor vehicle can consequently be permanently installed or for instance every time when the ready state was recognized be transmitted by the server device to the motor vehicle. Owing to the actual calculation algorithm, by which the computing data are processed, being provided independently from the data packets in the motor vehicle, the computing operations or the computing steps, which are performed during processing of a respective data packet in the motor vehicle, are provided fixed or pre-known. Thus, during the processing of a data packet no undesired or unknown operating state can occur, if the calculation algorithm prevents this. Only those operating states can occur that can occur according to the calculation algorithm. This can, however, be checked on the basis of the calculation algorithm itself and thus need not be monitored or checked for each data packet individually. By restricting the possible computing steps through the previously deposited calculation algorithm a defined, reproducible process is rendered in the motor vehicle. The calculation algorithm that is deposited is plausible, reproducible and/or verifiable for all data packets in advance. Thus, the operating process or process triggered by the data packets in the motor vehicle is known from the very beginning. In the data packets invariably only those input data, which are to be calculated by the calculation algorithm, but no new program code or computing instruction occurs. The calculation algorithm is depending on the computing task. The calculation algorithm of course can be changed in a motor vehicle in order to be able to solve or process hereby another computing task. An example of a calculation algorithm is a FEM (Finite Element Method) or a simulator. The FEM or the simulator can be pre-installed in the motor vehicle and each data packet only needs to comprise computing data that describe the physical objects or models to be simulated. The data packets do not need to comprise any processing instructions, like, e.g., binary program code, but only, e.g., model parameters.

The computing data provided in the data packets, however, can also represent a program code, which can be generally executed by a processing device of the motor vehicle. Then no prefabricated calculation algorithm is necessary. The calculation algorithm can be part of a firmware that is installed as part of manufacturing process and/or updated/flashed when connected to a charging station or remotely over a wireless connection hat is responsible for communication with the server device. The update can be performed initially, when the motor vehicle requests/reserves work (at least one data package) from the server device and/or instantiates the computation run based on payload/framework.

The server device preferably decides on the basis of at least one further criterion whether it makes sense to send a data packet to a motor vehicle or which data packet should be sent.

One embodiment comprises that by the server device in the data packets a computing effort is configured depending on a respective status signal concerning the respective motor vehicle, for which the data packet is determined. The computing effort can for instance indicate a required amount of time, i.e. an estimated period of time, which the motor vehicle requires for processing all computing data contained in the data packet. The computing effort can also for instance additionally or alternatively indicate an energy expense, i.e. an amount of energy, which the motor vehicle prospectively needs to provide when processing all computing data contained in the data packet. The computing effort is adjusted or set by selecting a quantity and/or a kind of computing data of the data packet in dependence on the status signal. In other words, a complexity of the computing data or the data packet in dependence on the status signal is selected or set or varied. Depending on the status signal also more or fewer computing data and/or a certain kind of the computing data can be combined or comprised in the data packet. This renders the advantage that the computing effort required in the motor vehicle by the data packet is adjusted to the status signal of the motor vehicle. The status signal can be entirely or partially be generated or defined by the motor vehicle itself and/or by the server device and/or a third, external unit, for instance a network control of a communication network, via which the server device and the motor vehicle communicate. As amount of time required for instance the computing effort can be varied in a range of between 0.5 seconds and 5 minutes. By the status signal, it may be considered at least one of the following aspects: location of the motor vehicle, technology capabilities (options) installed in the of the motor vehicle, as the capabilities may not be uniform/standard. Model/Series of the motor vehicle could be a considered additionally or alternatively. The format of the data packets is preferably uniform, which is a benefit regarding complexity and costs.

Several embodiments concern the question which status of the motor vehicle can be described by the status signal.

One embodiment comprises that by the status signal at least one property of the transmission path or transmission route is signaled, via which the server device and the motor vehicle are coupled. In other words, a transmission quality or transmission grade is described by the status signal. For instance, a transmission range or transmission rate and/or transmission costs can be described. Hereby the advantage is rendered that the proportion from computing load caused in the motor vehicle relative to the number of the data packets transmitted for this purpose is adjusted to the transmission path. Should for instance according to the status signal as few as possible data packets be transmitted (e.g., because of high transmission costs and/or low transmission rate), by the server device a data packet with few computing data, which however require a relatively long computing time, can be compiled. It then is sufficient to transmit this one data packet and hereby still generate in the motor vehicle computing load for a predetermined minimum period of time. Vice versa in the case of a transmission path with a large transmission rate (larger than a predetermined threshold value) it may be envisaged to transmit only such data packets, the prospective computing time of which is smaller, i.e. in concrete terms e.g., smaller than 10 seconds or smaller than 60 seconds. This entails the advantage that upon a termination of the ready state and/or the communication link, if it is no longer possible to transmit the computing result relating to the last, current data packet, only the computing time of this data packet is lost and this loss then is small (i.e. for instance maximally 10 seconds or 60 seconds, in comparison with, e.g., one hour computing time). This can be used when establishing, e.g., billing/reimbursement. Of course, there can also be simpler signals used than transmission rate.

One embodiment comprises that by the status signal at least one environmental condition, which is given in the motor vehicle, and/or one indication of place is signaled. One environmental condition can for instance be the temperature prevailing in the region of the motor vehicle. By considering an environmental condition and/or an indication of place the data packet can be adjusted to the local conditions of the motor vehicle. If the temperature is for instance below a predetermined threshold value, it can be assumed that sufficient cooling performance for the motor vehicle is given. The threshold value can for instance in one region be smaller than 15 degree, in particular lie below 10 degree. If the temperature, by contrast, is above a second threshold value, a transmission of data packets can even be done without. The second threshold value can for instance be in a range of above 25 degree, in particular above 35 degree or between the transmission of two data packets it is waited for a predetermined minimum time in order to allow for a cooling in the motor vehicle. An indication of place can for instance provide a hint at whether the motor vehicle may generate a noise as it can for instance be caused by one or several ventilators of the motor vehicle. If no such noise is generated, it can equally be done without the transmission or provision of data packets, or it is waited for a predetermined minimum time between the transmitting of two data packets in order to allow for a passive cooling in the motor vehicle. Additionally, further environmental factors, as they have already been described, can also be considered and factored in by the motor vehicle when determining its ready state.

The status signal can also signal an electrical fast charging process of the motor vehicle. In the case of a fast charging (charging of the electrical energy storage with an electrical performance that is larger than a predetermined threshold value, for instance larger than 10 kilowatt, in particular larger than 20 kilowatt), the server device will transmit no data packet for computing to the motor vehicle. Hereby it is advantageously avoided that the fast charging is extended, because in the motor vehicle computing performance and thus also electrical performance is consumed. Thus, the duration of the charging process is not extended unexpectedly from a user's point of view. This can be desirable when the user is travelling using the motor vehicle and the user only plans to stop for a limited amount of time for recharging the energy storage of the vehicle.

One embodiment comprises that by the status signal the rate at which the battery is charging is signaled. This may be used to disqualify the motor vehicle from obtaining a data packet if the rate of charging the battery is lower than the energy expense of one data packet. In other words this will take into account that the processing of the data packet requires a certain electrical power (Watts) and the motor vehicle may provide at least that amount of electrical power, or that the motor vehicle has not yet used up a predefined amount of energy and/or power for processing data packages within a specified time range or in average (e.g., x watts/minute). This helps limiting the amount of energy used up for processing data packets in a specific motor vehicle.

One embodiment comprises that the computing task that is solved by the server device in the described way by the motor vehicles comprises meteorological computations (computations of weather data) and/or medical computations (for instance of genome research and/or cancer research) and/or a simulation (for instance of a vehicle crash and/or a traffic flow) and/or a finite element computation. The method, however, is generally applicable. It merely needs to be a computing task, which can be calculated packet by packet, i.e. which allows for a division of the computing data into separate, independent data packets. For this purpose, a technique of parallelization of computing task can be applied. Generally, consequently a model computing and/or a pattern recognition can be envisaged as computing task. The algorithm required for this purpose can be predetermined in the form of the described calculation algorithm. The computing data of a data packet can then for instance be a camera image, in which a pattern recognition is to be conducted. The computing result can then be the result of the pattern recognition, i.e. for instance an indication that a certain object was recognized, or generally a classification result. This may guarantee that by processing any data package the computer of the vehicle may not end in an undefined state.

One embodiment comprises that the server device assigns to every transmitted data packet by a predetermined evaluation rule an equivalent value and for every computing result received from the at least one motor vehicle vehicle-specifically, i.e. individually for every motor vehicle, accumulates the equivalent values and on the basis of the vehicle-specific, accumulated equivalent values determines a computing performance rendered by the respective motor vehicle. In other words, it is determined which computing performance each motor vehicle has rendered individually. Hereby for instance an energy consumption can be monitored. The used evaluation rule can for instance comprise assigning to the individual computing data in each case a partial value. Equally, every data packet on the whole can be evaluated by the evaluation rule in order to hereby determine the equivalent value of the data packet. For instance, a billing system can be formed in order to remunerate an operator of a motor vehicle for providing his motor vehicle for computing of the data packets. Creating observation data through the entire process can be advantageous. A desirable aspect of this is that it allows to perform quality assurance on the work result of each motor vehicle. If each data packet were processed by at least two motor vehicles then one could compare results and only accept results where all (quorum) motor vehicles who were assigned a data packet sent in identical results. Any motor vehicle in the grouping that sent in a different result could be reviewed individually to see, if it was capable of providing accurate results.

The transmission of the at least one data packet and/or the respectively associated computing result can at least partly, i.e. entirely or partially, be effected via a radio connection. Such radio connection can be realized by a mobile radio network and/or a WLAN connection (Wireless Local Area Network) and/or a Bluetooth connection. For the mobile radio connection a SIM card can be permanently installed in the respective motor vehicle. By a radio connection the advantage is rendered that the transmission is independent of a cable infra structure in the environment of the motor vehicle. Additionally or alternatively, the transmission can at least partly be effected indirectly via a mobile terminal coupled with the motor vehicle and/or via an electrical charging station. The mobile terminal in each case can for instance be a smart phone or a tablet PC or a smart watch. A radio connection can then be used, which is provided by the mobile terminal. The coupling via a mobile terminal has the advantage that communication hardware and/or communication software need not be provided in the motor vehicle itself, but the one in the terminal can be used. Also, an electrical charging station for the motor vehicle can have a communication hardware and/or communication software, e.g., for transmitting billing data. It can also be used advantageously by the motor vehicle for the transmission. Additionally or alternatively, the transmission can at least partly be effected via a cable connected to the motor vehicle. For instance, a charging cable can be used, as it can be provided by the described electrical energy supply device or a charging station. The transmission can be realized via a PLC (Power Line Communication) connection and/or via a USB (Universal Serial Bus). In the case of the PLC connection consequently the transmission is performed by the electrical cables that also are used for the transmission of the charging current or the charging performance for charging the electrical energy storage of the motor vehicle. The tethered transmission has the advantage that a transmission rate is independent of radio interferences in the surroundings of the motor vehicle.

Utilizing a charging station as the motor vehicle conduit to/from the server device is preferred. Staging data packets on charging stations, if it is already known or predicted that a motor vehicle is going to be scheduled there can also be considered. PLC is a preferred transport mechanism for data packets, optionally along with, e.g., firmware.

The transmitting of the data packets and/or the computing results can of course be protected by a security mechanism. For instance, a communication link between the server device, on the one hand, and each motor vehicle, on the other hand, can rely on a TLS (Transport Layer Security) connection.

One further question relates to the determining of the ready state. It can be determined by at least one or several of the motor vehicles by themselves in each case whether it is currently in the ready state, and, in case it is in the ready state, the ready state be signaled to the server device. In the case of at least one or several of the motor vehicles the server device can enquire whether the respective motor vehicle is in the ready state. A motor vehicle consequently either comes forward itself, if all conditions for the ready state are fulfilled, or a wake-up mechanism is used, i.e. an enquiry performed from outside by the server device. It is preferred that the motor vehicle itself is the one who comes forward in order to reserve a data packet or server data packets from the server device. A motor vehicle reserves a data packet, the server device starts a timer on that reservation. If the timer finishes before any result is received that data packet is sent to another motor vehicle.

By the server device and the fleet of the motor vehicles on the whole a computing system is formed. The invention in some embodiments also comprises this computing system for processing or handling a certain predetermined computing task. The computing system consequently comprises the server device and several motor vehicles, in particular at least one, more particularly more than two or more than three motor vehicles. The server device and the motor vehicles in this connection are configured to perform an embodiment of the method according to the invention. The server device can comprise one computer or a compound of several computers. In the case of several computers these are coupled via a communication network, e.g., the internet. In the motor vehicle the method steps envisaged for the motor vehicle can be executed or performed for instance by the said processing unit, i.e. for instance by an electronic control unit or by a compound of several electronic control units. For this purpose, a program code can be provided in a data storage of the motor vehicle, which upon execution through the processing unit performs the steps of the method envisaged for the motor vehicle. For the server device, equally, a program code, e.g., in a data storage can be envisaged, which upon execution through the server device performs the steps of the method envisaged for the server device. The processing unit can be based on at least one CPU (Central Processing Unit) and/or at least one GPU (Graphical Processing Unit) and/or at least one FPGA (Field Programmable Gate Array) and/or at least one ASIC (Application Specific Integrated Circuit) and/or at least one DSP (Digital Signal Processing Unit).

The server device equally represents embodiments of the invention. The invention consequently also comprises the server device for the computing system according to the invention, wherein the server device is configured for performing the steps of the method according to the invention relating to the server device. The server device for this purpose can comprise the described program code in the described way. The program code can be stored in a data storage of the server device.

The invention finally also comprises a motor vehicle in some embodiments, which can be used as component of the computing system according to the invention. The motor vehicle is configured to perform the steps of the method according to the invention concerning a respective motor vehicle. For this purpose, the motor vehicle can comprise the processor device in the described way. Moreover, in the motor vehicle the described program code can be stored.

The features and advantages which have been described in relation to the different embodiments can include any combinations of the described embodiments.

BRIEF DESCRIPTION OF THE DRAWINGS

Further features of the invention derive from the figures and the description of the figures. The features and feature combinations previously mentioned in the description as well as the features and feature combinations mentioned in the following can be used not only in the respectively indicated combination, but also in other combinations or taken alone.

The invention is now explained in more detail on the basis of a preferred embodiment and by reference to the drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
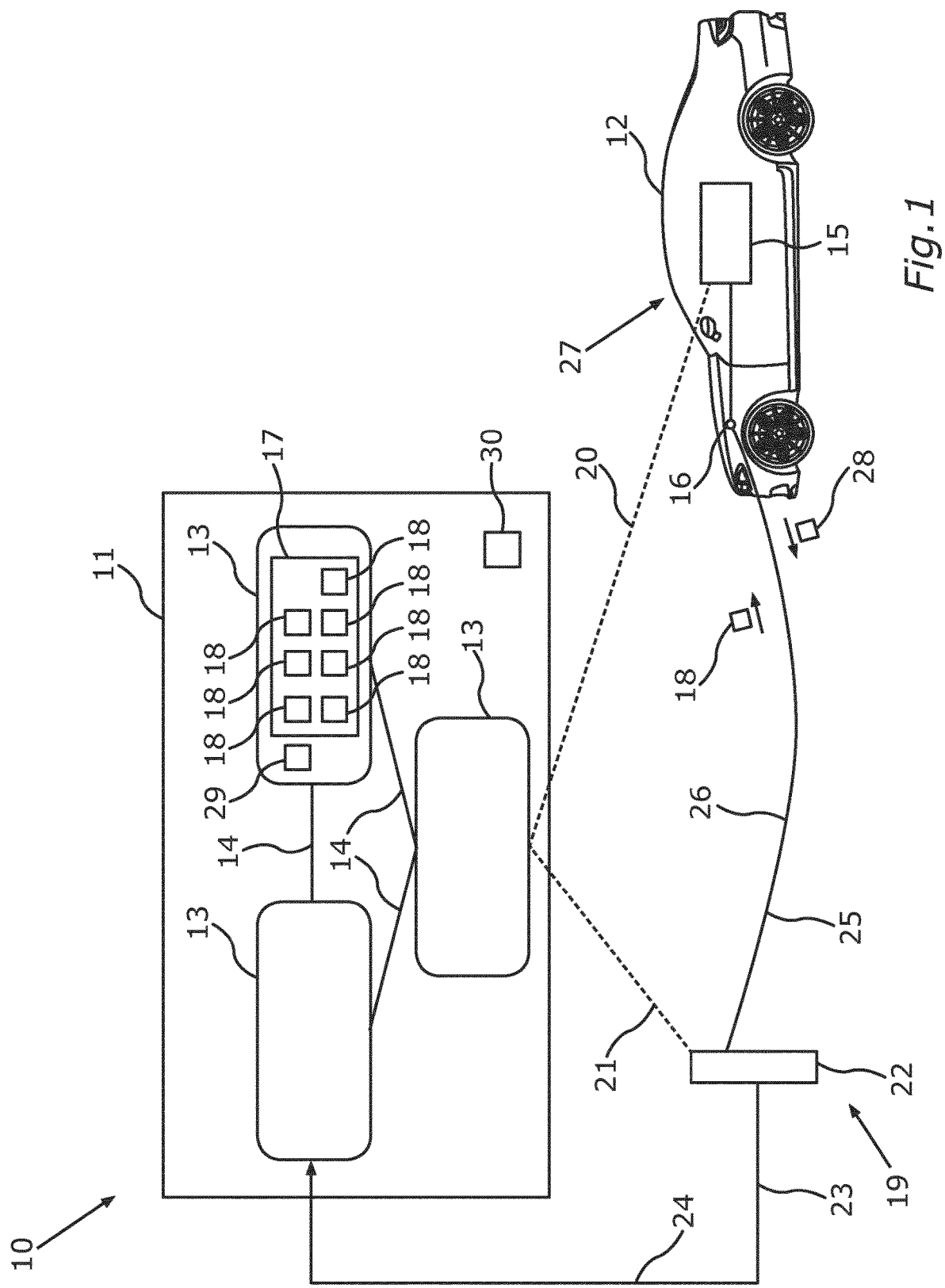
FIG. 1 is a schematic view of an embodiment of the computing system according to embodiments of the invention.

FIG. 1 is a computing system 10 with a server device 11 and a motor vehicle 12. The motor vehicle 12 represents several motor vehicles, all of which can be configured in the way described in the following, for which reason only one motor vehicle 12 is shown. The server device 11 can comprise one or several computers 13, wherein in the case of several computers 13 these can be coupled via a data network 14. The computers 13 can form a compound or a computer cloud.

The motor vehicle 12 can comprise a vehicle computer 15, which can for instance be configured to guide the motor vehicle 12 automatically or autonomously. The motor vehicle 12 can moreover comprise an electrical energy storage 16, which can for instance be a high voltage battery. The term "high voltage" in connection with this disclosure refers to an electrical voltage of more than 60 V, in particular more than 100 V. The motor vehicle 12 can for instance be an electrically drivable motor vehicle, for instance a hybrid vehicle or an electric vehicle.

Figure 2:
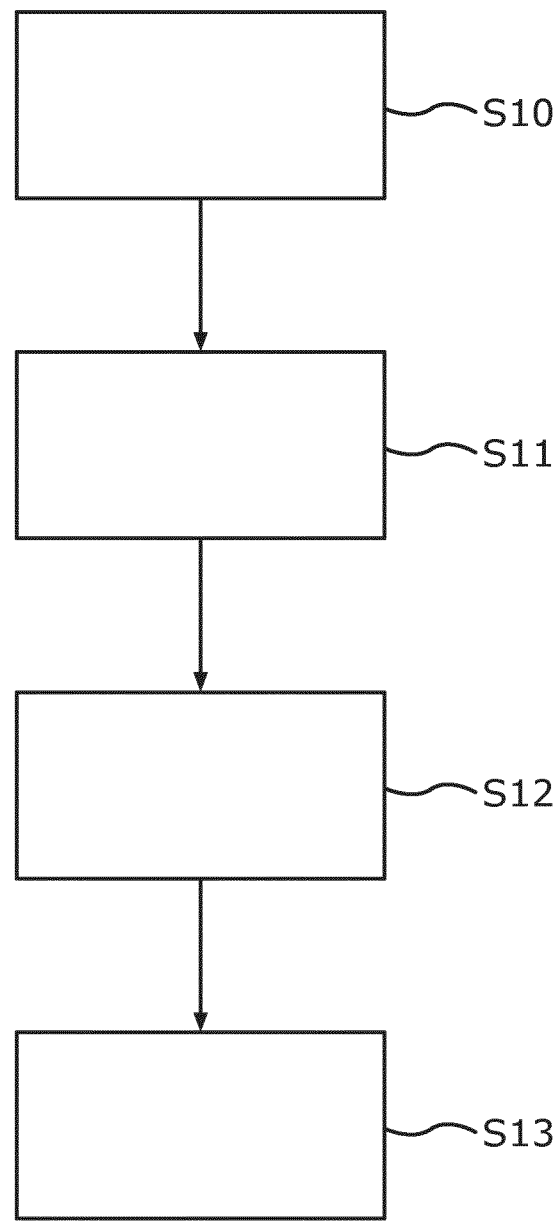
FIG. 2 is a flow diagram schematically illustrating an embodiment of the method according to embodiments of the invention.

In the computing system 10 the server device 11 can process or complete a computing task 17 with the aid of at least one motor vehicle 12. An exemplary method used as basis for this purpose in the computing system 10 is shown in FIG. 2 and in the following explained in connection with FIG. 1 and FIG. 2.

The computing task 17 in a step S10 can be segmented or divided into several data packets 18. In other words, the computing data, which are to be processed and that embody or represent the computing task 17, are distributed over several data packets 18.

The motor vehicle 12 and the server device 11 can be coupled via a communication device 19. The communication device 19 can for instance comprise a radio connection 20 to the motor vehicle 12 and/or an indirect radio connection 21 via an electric charging station 22 and/or a tethered communication link 23 via a power network 24 and/or a LAN (Local Area Network) and a connection cable 25. The motor vehicle 12 thus can generally exchange by cable and/or via mobile radio or a different radio connection bi-directionally data with the server device 11.

To the electrical charging station 22 the motor vehicle 12 can for instance be connected for a charging operation via a charging cable 26 for charging the electrical energy storage 16, which can also be used as the connection cable 25 for the data transmission. The charging station 22 represents an energy supply device for recharging the energy storage 16.

It may be envisaged that the charging operation in a step S11 is recognized by the motor vehicle as a ready state 27. In the ready state 27 the motor vehicle 12 need not perform any driving task. Therefore, the vehicle computer 15 can be used for other computing tasks, in particular for the processing of computing data in a data packet 18. The motor vehicle 12 can signal the ready state 27 in step S11 to the server device 11.

The server device 11 subsequently can transmit a data packet 18 in a step S12 via the communication device 19 to the motor vehicle 12. The motor vehicle 12 can process by the vehicle computer 15 the computing data from the transmitted data packet 18 and retransmit the output date resulting from this as computing result 28 to the server device 11.

When assigning the respective data packet to a motor vehicle 12 also a status signal 30 can be considered in order to select or compile a certain data packet 18. The status signal 30 can be configured in the already described manner.

Step S12 can be performed repeatedly.

In the server device 11 the computing results 28 for all transmitted data packets 18 are collected and in a step S13 an overall result 29 for the computing task 17 is formed therefrom.

The server device thus realizes a cloud computing, wherein remote subsystems provide computing power and thus achieve in sum a cumulated computing power. Each or several subsystems in this connection are realized by a motor vehicle 12. Hereby computing tasks can be solved distributed over many vehicles, for instance in the genome or cancer research or in the case of simulations, such as weather simulations and/or traffic simulations.

In the case of the computing system 10 a combination of the cloud computing or the distributed computing with a vehicle fleet of motor vehicles 12 derives in the event of their standing times or in their parking state. Whilst the computing power of a motor vehicle 12 during driving is used for the driving task (driving assistance, entertainment, communication, navigation), this computing power is fully available whilst the motor vehicle is standing or parking. Ideally, the motor vehicle, if it is an electrically drivable motor vehicle (electric vehicle, plug-in hybrid vehicle), is located at an energy supply device, for instance a charging station in order to have sufficient energy available for the computing or processing of the computing data of the respective data packet.

By the server device every time when a motor vehicle is in the ready state, this individual motor vehicle is triggered and/or via a security mechanism, for instance a TLS connection, a communication connection leading to the onboard computer or the vehicle computer of the motor vehicle is established. Now a data packet with computing data can be transmitted to the motor vehicle. This can also be achieved in two steps. For this purpose, to start with a general calculation algorithm can be transmitted to the motor vehicle, which indicates, which computing steps are to be performed. Then in each further data packet a parameter set can be transmitted to the motor vehicle. This parameter set provides the input data for the calculation algorithm. The motor vehicle can then execute the calculation algorithm and transmit the resulting output data as computing result to the server device. In the motor vehicle the computations can thus be performed autonomously and subsequently the finished computing result be transmitted back to the server device. After this, the calculation algorithm itself can be deleted in the motor vehicle and the data connection be closed. Also, consecutively several parameter sets per electrical loading operation can be transmitted, i.e. the transmitting of data packets can be repeated a random number of times, as long as the motor vehicle is in the ready state. Also, the finished computing results after the end of the ready state, for instance after the end of the charging state, can still be transmitted during a driving operation of the motor vehicle.

The employment of the general calculation algorithm and the later transmission of a respective parameter set have the advantage that in the case of repeated requesting or transmission of a data packet the data volume is smaller, since the calculation algorithm can be temporarily stored in the motor vehicle.

On the whole by the embodiment it is thus illustrated, how in a vehicle fleet the respective vehicle computers can be used for a cloud computing.

The embodiments described above are only descriptions of preferred embodiments of the present invention, and are not intended to limit the scope of the present invention. Various variations and modifications can be made to the technical solution of the present invention by those of ordinary skill in the art, without departing from the design and spirit of the present invention. The variations and modifications should all fall within the claimed scope defined by the claims of the present invention.

What is claimed is:

1. A method for processing a predetermined computing task by a distributed, vehicle-based computing system, wherein through a server device the computing task is divided into several data packets with respective computing data for a respective part of the computing task, wherein:
    for several motor vehicles it is determined in each case whether the vehicle currently is in a predetermined ready state, which comprises that the motor vehicle is coupled to an electrical energy supply device that is external to the vehicle,
    the server device respectively transmits the data packets to one of the motor vehicles, wherein the respective data packet in each case is transmitted only to such a motor vehicle which is in the predetermined ready state,
    the respective motor vehicle processes the respective computing data of this data packet that was transmitted and hereby generates a respective computing result related to the data packet that was transmitted and transmits the respective computing result to the server device, and
    the server device composes an overall result from each transmitted computing result related to the computing task,
    wherein the server device assigns to every transmitted data packet an equivalent value by a predetermined evaluation rule and accumulates for every computing result received from the motor vehicles vehicle-specifically the equivalent values and on the basis of the vehicle-specific, accumulated equivalent values determines a computing performance rendered by the respective motor vehicle.

2. The method of claim 1, wherein the predetermined ready state comprises that the respective motor vehicle is coupled to an electrical charging station for exchanging electrical energy between an electrical energy storage of the motor vehicle and an electric power network that is external to the vehicle.

3. The method of claim 1, wherein a prospective remaining duration of the predetermined ready state is determined and the predetermined ready state comprises that the remaining duration is larger than a predetermined minimum value.

4. The method of claim 3, wherein the remaining duration is determined in dependence on a user profile and/or calendar dates of a user of the motor vehicle and/or a booking period, for which the user has booked the energy supply device.

5. The method of claim 1, wherein for the case that the predetermined ready state ends before the respective motor vehicle transmits the computing result for a current data packet, the motor vehicle processes the remaining computing data of the current data packet and/or transmits the computing result to the server device after an end of the predetermined ready state.

6. The method of claim 1, wherein during the respective predetermined ready state of the respective motor vehicle in each case only one of the data packets is transmitted at a time and a next data packet is only transmitted in case the motor vehicle has transmitted the computing result related to a current data packet and/or requests the next data packet.

7. The method of claim 1, wherein prior to transmitting a first data packet for a current predetermined ready state, a calculation algorithm is deposited in the respective motor vehicle and the respective data packet contains as the computing data only input data that are to be processed by the calculation algorithm.

8. The method of claim 1, wherein by the server device for each of the data packets a computing effort is configured depending on a respective status signal concerning the respective motor vehicle, for which the data packet is determined, by selecting a quantity and/or a kind of the computing data of the data packet in dependence on the status signal.

9. The method of claim 8, wherein by the status signal at least one property of a transmission path, via which the server device and the motor vehicle are coupled, is signaled.

10. The method of claim 8, wherein by the status signal at least one environmental condition, which is given in the motor vehicle is signaled.

11. The method of claim 1, wherein the computing task comprises meteorological computations and/or medical computations and/or a finite element computation.

12. A computing system for processing a predetermined computing task, comprising a server device and several motor vehicles, wherein the server device and the motor vehicles are each configured to perform the method of claim 1.

13. The method of claim 2, wherein a prospective remaining duration of the predetermined ready state, specifically a prospective remaining charging time of the motor vehicle, is determined and the predetermined ready state comprises that the remaining duration is larger than a predetermined minimum value,
    wherein the remaining duration is determined in dependence on a user profile and/or calendar dates of a user of the motor vehicle and/or a booking period, for which the user has booked the energy supply device,
    wherein for the case that the predetermined ready state ends before the respective motor vehicle transmits the computing result for a current data packet, the motor vehicle processes the remaining computing data of the current data packet and/or transmits the computing result to the server device after an end of the predetermined ready state, specifically during a driving operation,
    wherein during the respective predetermined ready state of the respective motor vehicle in each case only one of the data packets is transmitted at a time and a next data packet is only transmitted in case the motor vehicle has transmitted the computing result related to a current data packet and/or requests the next data packet, wherein prior to transmitting a first data packet for a current predetermined ready state, a calculation algorithm is deposited in the respective motor vehicle the respective data packet contains as the computing data only input data that are to be processed by the calculation algorithm, wherein by the server device for each of the data packets a computing effort is configured depending on a respective status signal concerning the respective motor vehicle, for which the data packet is determined, by selecting a quantity and/or a kind of the computing data of the data packet in dependence on the status signal, wherein by the status signal at least one property of a transmission path, via which the server device and the motor vehicle are coupled, is signaled, wherein by the status signal at least one environmental condition, which is given in the motor vehicle, specifically a temperature and/or an indication of place, is signaled, and wherein the computing task comprises meteorological computations and/or medical computations and/or a finite element computation.

* * * * *